United States Patent [19]

Black

[11] 4,202,682
[45] May 13, 1980

[54] GLASS MANUFACTURE

[75] Inventor: Philip W. Black, Bishops Stortford, England

[73] Assignee: International Standard Electric Corporation, New York, N.Y.

[21] Appl. No.: 850,116

[22] Filed: Nov. 10, 1977

Related U.S. Application Data

[63] Continuation of Ser. No. 684,431, May 7, 1976, abandoned.

[51] Int. Cl.² ............................................. C03B 5/16
[52] U.S. Cl. .................................... 65/136; 65/3 A; 65/134; 65/DIG. 16
[58] Field of Search ................ 65/136, 3 A, DIG. 16, 65/3 A, 134, 2

[56] References Cited

U.S. PATENT DOCUMENTS

| | | | |
|---|---|---|---|
| 3,443,921 | 5/1969 | Boivent | 65/134 X |
| 3,957,474 | 5/1976 | Kobayashi et al. | 65/3 A |
| 3,966,446 | 6/1976 | Miller | 65/3 A X |
| 4,065,280 | 12/1977 | Kao et al. | 65/3 A |

Primary Examiner—Robert L. Lindsay, Jr.
Attorney, Agent, or Firm—John T. O'Halloran; Peter C. Van Der Sluys

[57] ABSTRACT

A method of making high purity glass by heating some of the glass ingredients in powder form to form a melt while adding other glass ingredients to the melt by chemical vapor deposition.

14 Claims, 1 Drawing Figure

GLASS MANUFACTURE

This is a continuation of application Ser. No. 684,431, filed May 7, 1976 now abandoned.

FIELD OF THE INVENTION

This invention relates to the preparation of pure glasses.

BACKGROUND OF THE INVENTION

For some applications, such as for optical fiver waveguide manufacture, very high purity glasses are required in which the impurity levels of less than 0.1 p.p.m. are desired. The normal manufacture of such glasses requires the use of high purity source materials in powder form.

For materials that are water soluble, such as the carbonates of potassium and sodium, high purity can be obtained by fractional crystallization. A modified version of the same method may also be used to prepare calcium carbonate, which is not soluble in water. In this case a soluble calcium salt is first purified by fractional crystallization, and then the carbonate is obtained by precipitation from solution by the addition to the solution of a soluble carbonate.

Other source materials, such as silica, alumina, boric oxide, and phosphorus pentoxide are not readily obtainable by fractional crystallization, but can be obtained by the oxidation of pure volatile compounds that have been purified by fractional distillation. Many of these volatile compounds have been prepared in exceptionally pure forms to meet the existing demands of semiconductor technology. However, although it is possible to produce these oxides in pure form by a chemical vapor reaction, the product is usually particularly liable to contamination during subsequent handling. This is because either the product is produced in the form of a boule which is liable to contamination when being crushed to form a powder of suitable grain size for glass making, or the product is produced in the form of a very fine, low bulk density, absorbent, and highly reactive powder that is liable to become contaminated with any inpurity to which it may become accidentally exposed. Grain size is particularly important where a high degree of homogeneity is essential.

Nevertheless in respect of the more commonly used glass making source materials, such as boric oxide and silica, the need for very pure materials has been sufficiently long standing and sufficiently extensive for technologies to have been developed to produce these materials with a high degree of purity and a grain size suitable for glass manufacture. It should be appreciated that a particular powder may be adequately pure for use in making one glass composition for one application, while it may be unacceptable for another glass composition having the same or differing overall purity requirements. One significant factor will be the proportion of that material that is being called for in the composition being made.

SUMMARY OF THE INVENTION

According to the present invention there is provided a method of making a glass wherein a melt is made of one or more of the constituents of the glass, or their precursors, which melt may include one or more undissolved phases, and wherein the remaining constituents of the glass are added to the melt by chemical vapor deposition.

In accordance with this method those constituents of a desired glass composition that are readily available in an adequately pure oxide, or oxide precursor, (e.g. nitrate or carbonate) powder form of suitable grain size are melted together, while one or more other constituents that can not readily be obtained as oxides, or their precursors, of suitable purity and grain size are added to the melt by chemical vapor deposition, using suitably pure volatile compounds.

In the case of a small addition, typically not more than 5 mole %, by chemical vapor deposition, it is generally possible to achieve satisfactory results by arranging for the chemical vapor reactions to take place at, or just above, the surface of the melt. Diffusion of the deposited material into the melt will provide a measure of homogenization, but this may need to be assisted by stirring. For larger additions it may be preferred to perform the chemical vapor reaction in stages interspersed with additions to the melt of batches of the powder constituent or constituents.

It is to be noted that the initial melt does not itself have to be a glass. Thus, for instance, it is possible to make a soda-lime-silicate glass by starting with a melt formed by heating sodium and calcium carbonate, and then adding the required silica by reacting silicon tetrachloride with oxygen. Neither is it necessary in cases where the vapor deposited constituent or constituents have the property of promoting homogeneity for the initial melt to be homogeneous, or even a single phase.

One example of an application of the invention concerns the addition of small amounts, typically up to 2 mole %, of alumina to sodium borosilicate glasses in order to reduce the tendency for phase separation. The alumina may be deposited by entraining an aluminum halide, such as aluminum trichloride, in oxygen, and promoting the oxidation of the halide, either thermally, or with the aid of a plasma flame. The alumina produced by this reaction is in a form that is readily incorporated into the host glass.

Another example concerns the addition of small amounts, typically not more than 1 mole %, of arsenic oxide to modify the valence states of certain residual impurities in sodium borosilicate glasses. The arsenic oxide may conveniently be deposited by a thermally induced halide oxidation reaction using arsenic trichloride entrained in oxygen.

A further example involves the formation of sodium borosilicate glasses themselves. A feature of such glasses prepared from powdered constituents including boric oxide powder is the hydroxyl ion contamination of the product that is attributable mainly to the affinity of boric oxide for atmospheric moisture. By the use of direct oxidation of a boron halide above a sodium silicate melt, the boric oxide may be added in a pure hydroxyl-free form. Elimination of hydroxyl groups is required for many optical applications where the presence of such groups in the final product would cause undesirable absorption.

When two or more constituents are to be added by chemical vapor deposition to a melt, it may not be convenient to deposit them simultaneously having regard in particular to their vapor pressures, reaction rates, and their solubilities in the melt, all of which are significantly temperature dependent. On the other hand it is found in some instances the co-deposition of different oxides may increase a rate of reaction. For example the rate of formation and incorporation of silica can be enhanced by co-depositing it with a number of different oxides including those of arsenic, phosphorus, and boron.

In certain instances, such as where silica is the sole vapor deposited constituent, the rate of reaction can be enhanced by introducing in reagents through a plasma flame to provide additional energy for the reaction. Where the presence of hydroxyl groups is not a disadvantage the rate of reaction can alternatively be enhanced by substituting a flame hydrolysis reaction for the direct oxidation reaction.

There follows a description of apparatus in which a glass composition can be prepared by forming a melt of one or more of the glass constituents and by adding one or more further constituents by chemical vapor deposition. The description refers to the accompanying drawing which depicts apparatus in which a melt is heated by r.f. induction heating.

DESCRIPTION OF THE PREFERRED EMBODIMENT

Figure 1:
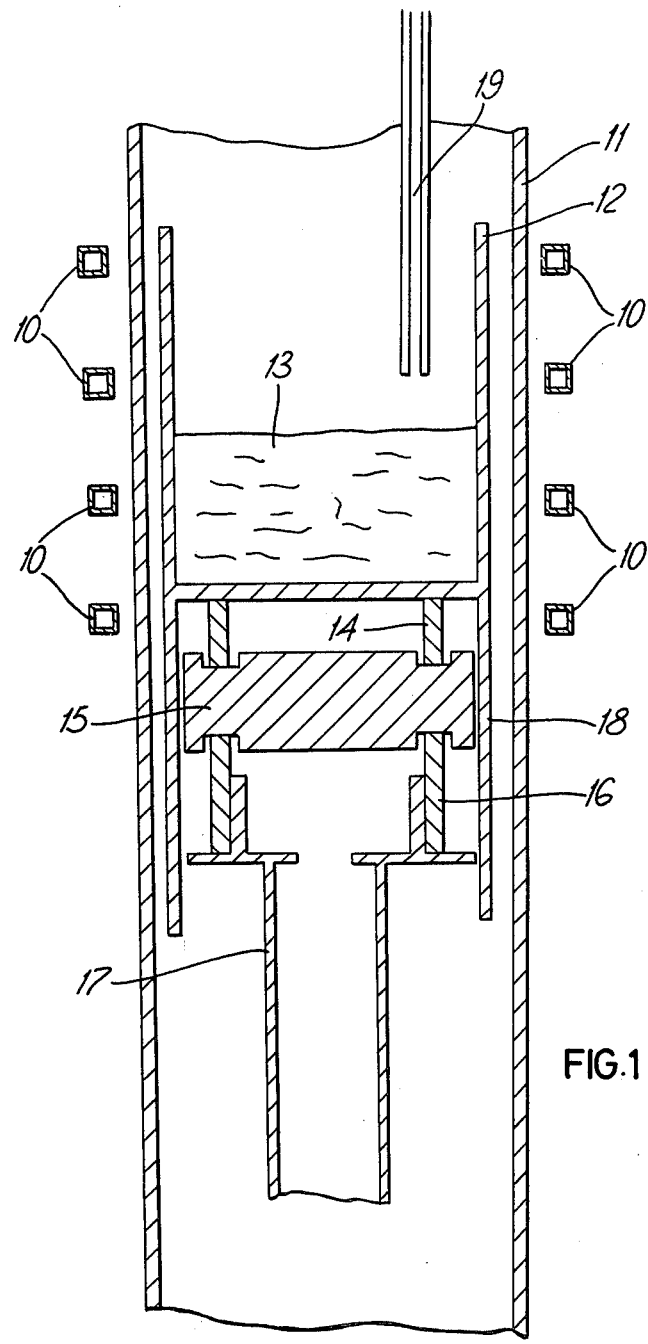
FIG. 1 is a sectional view of the apparatus used to melt the pure glass according to this invention.

Direct r.f. heating is a particularly suitable method of supplying heat to a melt of the powder constituents of the glass being prepared because its use can avoid three main sources of contamination that are liable to occur with electric or flame surface heating. These are, contamination released from the hot refractory lining of the furnace; that released form the crucible containing the melt; and that derived from the flame or released from the heating element. With direct r.f. heating, the crucible may be cooled with a gaseous or liquid coolat to a temperature significantly below that of the melt. There is no hot refractory lining and the source is non-contaminating.

With inductive r.f. heating, it is generally necessary to arrange for pre-heating of the powder charge, because this does not couple efficiently into the electric field at room temperatures. During a pre-heating stage it is desirable to use a non-contaminating heat source, and also to cool the crucible, but, particularly in the case of the latter, it is not so important in pre-heating, as later in fining and homogenizing. This is due to the shorter time and lower temperature involved in pre-heating. For most applications contamination is kept within acceptable bounds when pre-heating is effected by radiated and conducted heat from a susceptor, typically of graphite, placed beneath, around, over, or within the powder constituents. Contamination by the graphite can be eliminated by encapsulating it in, for instance, silicon, silica, or silicon carbide. Silicon may be used on its own as an alternative susceptor material.

Referring now to FIG. 1, the water cooled work coil 10 of an r.f. induction heater operating typically at between 2 and 6 MHz, and capable of delivering 25 KW of r.f. power into a suitable load, surrounds a silica jacket 11 up through which a gaseous coolant, in the form of filtered nitrogen, is supplied at a rate of about 20 liters per minutes. Inside the jacket 11 is a silica crucible 12 containing a melt of the powder constituents of a glass composition. The crucible rests on an alumina support 14 located in a groove in a graphite susceptor 15. The susceptor rests on a further alumina support 16 which is located on a silica support 17. the silica support 17 is constructed so that it can be rotated about its axis and moved up and down during the process of making a glass. The crucible 12 is provided with a skirt 18 to prevent it from toppling off the support 17 when it is being rotated. A delivery pipe 19 dips vertically into the crucible. This pipe is mounted in a gland (not shown) which allows it to be moved up and down. When it is in use, it is lowered until it terminates just above the melt surface but at other times it is retracted well clear of the melt.

A charge of a few hundred grams of the powder constituents of a glass composition is prepared, and a portion of this charge is placed in the crucible to fill it it a depth typically of about 2 cm. A cover (not shown) is placed over the silica jacket 11. This cover has a vent to allow the escape of the nitrogen flowing up inside the jacket 11. Then the silica support is raised until the susceptor 15 couples into the r.f. field. As the temperature of the powder in the crucible is raised and it begins to form a melt it will become capable, at a temperature typically in the region of 800° to 1000° C., of coupling directly into the r.f. field. If, with the susceptor in the raised position, this coupling begins to occur, it will normally affect the total coupling of power from the power supply. When this is noticed, the silica support 17 may be lowered to take the susceptor out of the r.f. field.

At this stage the melt is ready for the addition of the rest of the charge in batches. Either after this addition, or interspersed with it, one or more other constituents are added by chemical vapor deposition upon the melt surface. For this purpose the delivery pipe 19 is lowered to just above the melt surface, and then the reagents of the chemical vapor deposition reactions are caused to flow through the pipe to issue in the vicinity of the melt. Usually, when the reaction is between a halide and oxygen, only the delivery pipe is necessary because the required reaction process will not proceed at low temperatures, and hence the reagents may safely be premixed. The reaction then proceeds at the hot melt surface. In some circumstances it may be necessary to cool the delivery pipe so as to prevent premature deposition within its bore. The halide vapor is conveniently entrained in a stream of oxygen bubbled through a suitable liquid halide maintained at a controlled temperature.

The deposit may diffuse straight into the melt, or it may form a surface layer, depending upon the process parameters and reagents involved. Diffusion may be assisted by stirring the melt during the deposition reaction. Stirring is conveniently effected by dipping a stirrer into the melt and then rotating the crucible. In other circumstances, particularly where diffusion is slow, it is better temporarily to halt the deposit, to raise the melt temperature, to stire in the deposit, and then to lower the temperatures and recommence deposition. This cycle of events may be repeated several times.

It is to be understood that the foregoing description of specific examples of this invention is made by way of example only and is not to be considered as a limitation on its scope.

What is claimed is:

1. A method of making high purity glass comprising a plurality of glass forming constituents, comprising the steps of:
    heating a portion of said constituents in a powdered form to form a melt therefrom; and
    adding the remainder of each of said constituents to said melt as a product of a chemical vapor deposition reaction, by forming said product by said chemical vapor deposition reaction at or near the surface of said melt.

2. The method of claim 1 wherein said portion of said constituents further includes oxide precursors thereof.

3. The method of claim 1 wherein said portion of said constituents is in pure powdered form.

4. The method of claim 1 wherein said product is formed from a pure volatile compound in vapor form.

5. The method of claim 1 wherein said remainder of each of said constituents are added to said melt utilizing a direct oxidation reaction of a halide.

6. The method of claim 1 wherein said forming said product by said chemical vapor deposition reaction comprises thermally oxidizing a halide selected from the group consisting of aluminum trichloride, arsenic trichloride, boron trichloride, and silicon tetrachloride.

7. The method of claim 6 wherein said halide is entrained in a stream of oxygen.

8. The method of claim 1 wherein said heating to form a melt is achieved by subjecting said portion of said constituents to RF induction heating.

9. The method of claim 1 wherein said forming said product by said chemical vapor deposition reaction is induced by RF induction heating.

10. A method of making high purity glass comprising a plurality of glass forming constituents, comprising the steps of:

heating a portion of said constituents in pure powdered form to form a melt therefrom;

reacting a volatile compound in vapor form to produce a chemical vapor deposition product comprising a glass forming constituent; and adding said chemical vapor deposition product to said melt by forming said product by said chemical vapor deposition at or near the surface of said melt.

11. The method of claim 10 further including the step of adding said chemical vapor deposition product in stages interspersed with additions to said melt of said portions of said constituents.

12. The method of claim 10 wherein adding said chemical vapor deposition product to said melt comprises adding a plurality of said products simultaneously.

13. The method of claim 10 wherein said reacting is enhanced by introducing said volatile compound in vapor form through a plasma flame to provide additional energy for said reacting.

14. A method of making high purity glass from constituents thereof comprising the steps of:

forming a melt by heating at least one of said constituents or their precursors in a powdered form; and adding the remaining of said constituents to said melt by forming said remaining constituents at or near the surface of said melt as the product of chemical vapor reaction.

* * * * *